3,072,070
THREAD LOCKING DEVICE FOR A DISCHARGE CONNECTION OF A SUBMERSIBLE PUMP
George L. Marcell, Elkhorn, Wis., assignor to Sta-Rite Products, Inc., Delavan, Wis., a corporation of Wisconsin
Filed Dec. 4, 1958, Ser. No. 778,235
3 Claims. (Cl. 103—219)

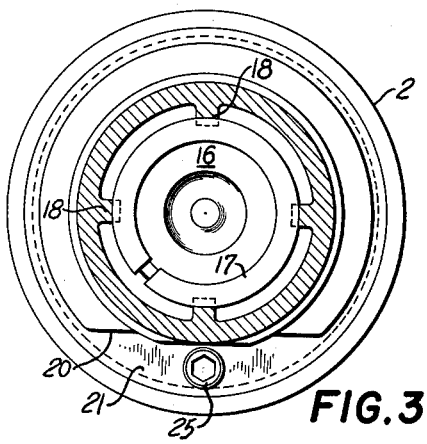
FIG.3.
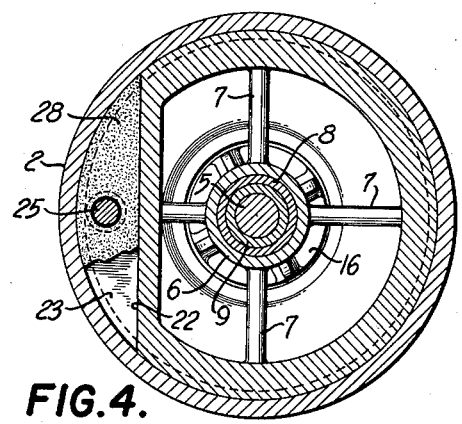
FIG.4.
FIG.1.
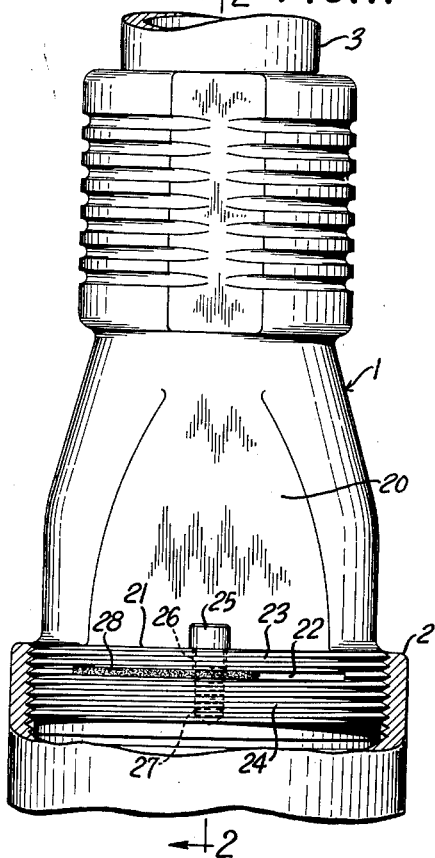
FIG.2.
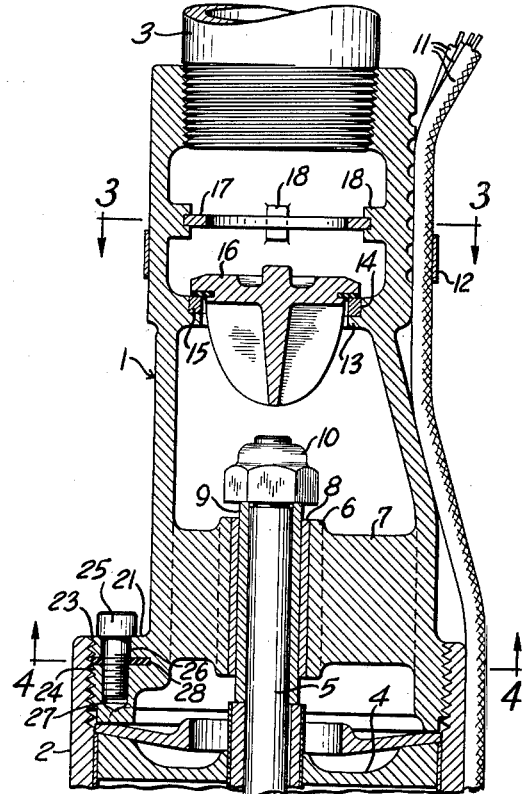
INVENTOR.
GEORGE L. MARCELL
BY
Attorneys

United States Patent Office 3,072,070
Patented Jan. 8, 1963

This invention relates to a discharge connection for a submersible pump and more particularly to a structure for locking the threaded joint between the discharge connection and the pump housing.

In a submersible pump, a discharge connection is threadedly engaged with the upper end of the pump housing and connects the pump housing with the discharge pipe. Under static loads, the threaded joint between the pump housing and the discharge connection will hold without problem. However, under operating conditions, there is a tendency for the joint to unthread. To lock the threaded joint between the discharge connection and the pipe housing, it has been proposed to employ a set screw which extends radially through aligned tapped holes in the threaded ends of both the pipe housing and discharge connection. However, the use of this type of thread lock provides definite disadvantages in that the radially extending set screw increases the radial dimension of the pump. The submersible pump is disposed within a well casing which is of fixed internal diameter and therefore, an external projection on the surface of the pump will correspondingly decrease the diameter of the pump and the pumping capacity.

Furthermore, the use of a radial set screw, which extends through the threaded joint, provides a difficulty in that once the joint is unthreaded, it is difficult on reassembly to align the tapped holes in the discharge connection and the pump housing. Usually, it is necessary to re-tap the holes once the joint is reassembled.

The present invention provides an improved device for locking a threaded joint between the discharge connection and the pump housing. According to the invention, the threaded end of the discharge connection is slit circumferentially to provide a threaded deformable lip. A deforming member, such as an axially extending set screw, is engageable with the lip and serves to bend or deform the lip to bind the threads on the lip with the threaded end of the pipe housing. This binding of threads will lock the discharge connection firmly to the pipe housing and prevent unthreading of the joint during operation of the pump.

By releasing the set screw, the lip will return to its original position so that the discharge connection can be unthreaded from the pipe housing.

On re-connecting the discharge connection and the pipe housing, no realignment of openings is required, as is necessary when using a radially extending set screw. Furthermore, the set screw or other deforming means, extends axially of the discharge connection and is located within the external diameter of the pump housing. Therefore, no increase in diameter of the pump housing is brought about and the capacity of the pump will be retained with the use of the present invention.

The present invention improves the serviceability of the submersible pump in that no re-drilling or re-tapping of the openings in the joint is required on re-assembly of the members. Furthermore, the discharge connection can be unthreaded from the pump housing with the use of common hand tools. On re-assembly of the members, the discharge connection can be threaded down until tight, there being no critical axial or radial dimensions to be maintained.

The use of the present locking device for the threaded joint eliminates the leakage problem which frequently occurs through tapped holes extending radially through the threaded ends of the discharge connection and pump housing.

Other objects and advantages will appear in the course of the following description.

The drawings illustrate the best mode presently contemplated of carrying out the invention.

In the drawings:
FIGURE 1 is a side elevation of the discharge connection of the present invention;
FIG. 2 is a vertical section taken along lines 2—2 of FIG. 1;
FIG. 3 is a transverse section taken along lines 3—3 of FIG. 2; and
FIG. 4 is a transverse section taken along lines 4—4 of FIG. 2.

The drawings illustrate a discharge connection 1 for a submersible pump. The lower end of the discharge connection 1 is threadedly engaged with the upper end of the pump housing 2 while the upper end of the connection 1 is connected to the discharge pipe 3.

The pump housing 2 houses a series or stack of impellers 4 which are driven by a drive shaft 5. The upper end of the drive shaft 5 is journaled within a hub 6 carried by a spider support 7 formed in the inner walls of the discharge connection 1. The hub 6 is provided with a bearing 8, and a sleeve 9 is secured to the drive shaft 5 and rotates within the bearing 8. The lower end of the sleeve 9 is supported on the hub of the uppermost impeller 4 in the stack.

The drive shaft 5 is secured within the hub 6 by a nut 10 which is threadedly engaged with the upper end of the shaft.

Suitable electrical leads 11 extend downwardly along the outer surface of the pipe housing 2 and are connected to the motor, not shown. The electrical leads are secured to the outer surface of the discharge connection 1 by a clip 12.

The interior surface of the discharge connection 1 is provided with an internal flange 13 having an upwardly extending notch 14 or shoulder. An annular valve seat 15 rests in the notch 14 and supports a check valve 16. The check valve 16 is adapted to permit the upward flow of water through the discharge connection to the discharge pipe and prevents the downward flow of water back to the pump.

To prevent outward displacement of the check valve 16 through the discharge pipe 3, a snap retaining ring 17 is secured to the inner wall of the discharge connection upwardly of the check valve. The internal wall of the discharge connection 1 is provided with a series of internal projections 18, each of which is provided with a horizontal groove 19 which receives the snap ring 17.

As the threaded joint between the discharge connection 1 and the pipe housing 2 has a tendency to become unthreaded during normal operation, a device is employed to positively lock the threaded joint. In this regard, the discharge connection 1 is provided with at least one generally flat surface 20 which terminates in an outwardly extending flange 21. The threaded end of discharge connection 1 is provided with a circumferentially extending slit 22 which is located in vertical alignment with the flat surface 20 and flange 21. The slit 22 divides the flange 21 into an upper threaded deformable lip 23 and a lower, threaded, generally rigid portion 24.

The threads on the lip 23 of the discharge connection 1 are jammed into engagement with the internal threads of the pipe housing 2 by means of a set screw 25 which extends through an axial opening 26 in the deformable lip 23 and is threaded within a tapped hole 27 formed in the rigid portion 24 of the flange 21.

By threading the screw 25 within the hole 27, the lip 23 is bent or deformed downwardly causing the threads on the lip 23 to bind with the internal threads on the pipe housing. The binding of the threads firmly locks the discharge connection 1 to the pipe housing 2 and prevents unthreading of the joint during normal operation.

While the above description shows the use of the screw 25 to deform the lip and bind the threads, it is contemplated that any other means which extends axially of the connection and does not increase the external diameter of the pump may be employed to deform the lip. Similarly, while the description shows the lip to be a portion of the threaded end of the discharge connection and formed by the slit 22 it is contemplated that the threaded end of the discharge connection can be made in two sections with the upper section corresponding to the deformable lip.

To provide an increased binding action between the threads, a rubber inset 23 can be disposed within the slit 22 in the discharge connection. By threading down the screw 25, the rubber inset will further increase the binding action between the threaded members.

The present invention provides a very simple and inexpensive device for locking the threaded joint between the discharge connection and the pump housing. As the set screw 25 or other device employed to deform the lip extends axially of the discharge connection, no increase in diameter of the pump results. In a submersible pump, the external diameter is critical and any projection on the outside of the pump will necessarily result in a smaller diameter for the pump housing. A smaller pump housing diameter will correspondingly reduce the capacity of the pump. Furthermore, any projection on the outer surface of the pump housing is disadvantageous because a projection can easily be knocked off when inserting or removing the pump from the well casing.

The present invention provides improved serviceability for the submersible pump in that the discharge connection can be readily removed from the pump housing and reconnected without any need for realigning tapped holes in the threaded joint. Similarly, no redrilling or tapping is necessary when the discharge connection and pump housing are reconnected.

The locking device of the invention provides a positive lock between the threaded elements and prevents the same from unthreading during normal operation of the pump. Furthermore, while the lip is distorted or deformed to bind the threaded connection, no permanent distortion of the lip or threads results and therefore, the threaded joint can be disassembled and assembled as desired.

Furthermore, the axially extending set screw of the present invention eliminates a leakage problem which may occur if the set screw extends radially through tapped holes in the threaded joint.

Various modes of carrying out the invention are contemplated as being within the scope of the following claims particularly pointing out and distinctly claiming the subject matter which is regarded as the invention.

I claim:

1. In a submersible pump unit adapted to be disposed within a well casing, a tubular discharge connection communicating with a discharge pipe and disposed vertically within the well casing, and having an external threaded lower end, recess means disposed in said connection above said threaded lower end to provide a horizontal ledge thereabove, said threaded lower end having a circumferentially extending slot disposed beneath said ledge and defining in combination with said ledge a deformable threaded lip, a pump housing having an internal threaded upper end connected to the threaded lower end of said discharge connection, and locking means disposed on said ledge and located inwardly of the external diameter of said discharge connection for deforming said lip to thereby bind the threaded lip with the threaded end of the pump housing to lock the discharge connection to the pump housing.

2. In a submersible pump unit, a discharge connection, a flange extending radially outwardly from an end of said discharge connection, an external thread disposed on the end of said discharge connection and extending over said flange, said flange having a circumferentially extending slot to divide the flange into a thin threaded section and a second threaded section, said thin threaded section having an axially opening therein and said second threaded section having a threaded hole in alignment with said opening, a pump housing having an internally threaded end portion engaged with said thin threaded section and said second threaded section, and a set screw extending through said opening and engaged with said threaded hole to bend said thin threaded section toward said second threaded section and thereby bind the threads of the thin threaded section with the threaded end of said pump housing to lock the discharge connection to the pump housing.

3. In a submersible pump unit adapted to be disposed within a well casing a tubular discharge connection communicating with a discharge pipe and disposed vertically within the well casing and having an externally threaded lower end, a portion of the outer surface of the discharge connection deviating inwardly to provide a horizontal shelf above the threaded lower end, said threaded lower end having a circumferentially extending slot disposed beneath said shelf and defining in combination with said shelf a deformable threaded lip, a pump housing having an internally threaded upper end connected to the threaded lower end of said discharge connection, an impeller disposed within the pump housing, and a binding member disposed within an opening in the lip and engaged with the lower end of the discharge connection beneath the lip and serving to deform the lip to thereby bind the threaded lip with the threaded end of the pump housing to lock the discharge connection to the pump housing, said opening extending parallel to the axis of the discharge connection and being disposed radially inward of the periphery of the impeller.

References Cited in the file of this patent

UNITED STATES PATENTS

| | | |
|---|---|---|
| 518,474 | Wallace | Apr. 17, 1894 |
| 906,333 | Swanberg | Dec. 8, 1908 |
| 1,947,630 | Wernert | Feb. 20, 1934 |
| 2,444,847 | Poupitch | July 6, 1948 |
| 2,624,609 | Storm | Jan. 6, 1953 |
| 2,670,686 | Bergh | Mar. 2, 1954 |
| 2,694,430 | Andershock | Nov. 16, 1954 |
| 2,809,590 | Brown | Oct. 10, 1957 |
| 2,921,532 | Tsiguloff | Jan. 19, 1960 |

FOREIGN PATENTS

| | | |
|---|---|---|
| 467,707 | France | Apr. 3, 1914 |
| 627,447 | Great Britain | Apr. 9, 1949 |